United States Patent
Hundemer

(10) Patent No.: US 9,578,274 B2
(45) Date of Patent: *Feb. 21, 2017

(54) NEWS PRODUCTION SYSTEM WITH INTEGRATED DISPLAY

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,242

(22) Filed: Jul. 21, 2015

(65) Prior Publication Data

US 2015/0326817 A1    Nov. 12, 2015

Related U.S. Application Data

(63) Continuation of application No. 14/213,633, filed on Mar. 14, 2014, now Pat. No. 9,118,888.

(51) Int. Cl.
*H04N 5/93* (2006.01)
*G11B 27/00* (2006.01)
*H04N 5/765* (2006.01)
*H04N 5/77* (2006.01)
*H04N 9/87* (2006.01)
*H04N 21/232* (2011.01)
(Continued)

(52) U.S. Cl.
CPC ............. *H04N 5/765* (2013.01); *H04N 5/77* (2013.01); *H04N 5/93* (2013.01); *H04N 9/87* (2013.01); *H04N 21/2326* (2013.01); *H04N 21/262* (2013.01)

(58) Field of Classification Search
CPC .............. H04N 5/93; H04N 9/80; G11B 27/00
USPC ................. 386/278, 280, 281, 282, 239, 243
See application file for complete search history.

(56) References Cited

U.S. PATENT DOCUMENTS 5,115,310 A    5/1992 Takano et al.
6,091,407 A    7/2000 Boetje et al.
(Continued)

FOREIGN PATENT DOCUMENTS

JP        2007519381 A    7/2007

OTHER PUBLICATIONS

International Search Report and Written Opinion dated Jun. 1, 2015, issued in connection with International Patent Application No. PCT/US2015/019098, filed on Mar. 6, 2015.

*Primary Examiner* — Daquan Zhao
(74) *Attorney, Agent, or Firm* — McDonnell Boehnen Hulbert & Berghoff LLP

(57) ABSTRACT

An example news production system includes a scheduling system, a composite display, and a camera. The scheduling system accesses a news program schedule that specifies a sequence of actions to be performed by the news production system. The scheduling system reads entries from the news program schedule, identifies actions associated with each, and sends signals to cause the actions to be performed. The news production system may cause the composite display to render video content in accordance with a specified layout. A camera can capture video of a field of view that includes at least a portion of the composite display while the specified video content is rendered thereon. The news production system may also cause an output video stream to be based, at least in part, on the captured video.

20 Claims, 4 Drawing Sheets

(51) Int. Cl.
*H04N 21/262* (2011.01)
*H04N 9/80* (2006.01)

(56) References Cited

U.S. PATENT DOCUMENTS

| | | | | |
|---|---|---|---|---|
| 6,177,931 | B1* | 1/2001 | Alexander | G06Q 30/0269 |
| | | | | 348/565 |
| 6,388,713 | B1* | 5/2002 | Saiki | H04N 5/44543 |
| | | | | 348/180 |
| 6,477,707 | B1* | 11/2002 | King | H04N 21/21 |
| | | | | 348/E5.008 |
| 7,096,486 | B1* | 8/2006 | Ukai | H04N 5/44543 |
| | | | | 348/E5.105 |
| 7,373,650 | B1* | 5/2008 | Rodriguez | H04N 5/44591 |
| | | | | 348/565 |
| 8,903,224 | B1* | 12/2014 | Shah | G11B 27/34 |
| | | | | 386/278 |
| 2002/0063774 | A1* | 5/2002 | Hillis | H04N 7/144 |
| | | | | 348/14.01 |
| 2002/0109710 | A1 | 8/2002 | Holtz et al. | |
| 2003/0061618 | A1* | 3/2003 | Horiuchi | H04H 60/31 |
| | | | | 725/87 |
| 2003/0212995 | A1* | 11/2003 | Kitamori | H04N 5/44543 |
| | | | | 725/41 |
| 2007/0073906 | A1 | 3/2007 | Paulsen | |
| 2010/0239229 | A1* | 9/2010 | Kawabe | G11B 27/034 |
| | | | | 386/200 |

* cited by examiner

NEWS PRODUCTION SYSTEM WITH INTEGRATED DISPLAY

RELATED DISCLOSURES

This disclosure is a continuation of, and claims priority to, U.S. patent application Ser. No. 14/213,633.

USAGE AND TERMINOLOGY

Throughout this application, with respect to all reasonable derivatives of such terms, and unless otherwise specified (and/or unless the particular context clearly dictates otherwise), each usage of:

"a" or "an" means at least one.
"the" means the at least one.
"video" means any material represented in a video format (i.e., having multiple frames). In some instances, video may include multiple sequential frames that are identical or nearly identical, and that may give the impression of a still image. Video may or may not include an audio portion.
"clip" means a portion of video.
"player" means a video player.

TECHNICAL FIELD

The disclosed system and method relate generally to sequencing and scheduling events, such as in connection with a news production system.

BACKGROUND

Unless otherwise indicated herein, the materials described in this section are not prior art to the claims in this disclosure and are not admitted to be prior art by inclusion in this section.

A news production system (NPS) may facilitate the production of a news program for television broadcast, or other broadcast. In this context, the news production system may produce a news program in accordance with a news program schedule (sometimes called a "rundown"), which specifies an order of events related to the production of the news program. For instance, a news program schedule may indicate that various clips are to be loaded and played out by a player in a particular order so that the clips may be part of the news program.

The news program schedule may indicate events in which video is captured via a camera on a news set. Such video capture events may include capturing video of news anchor (or another individual such as a reporter, correspondent, actor, or news personality) discussing news stories. The news program schedule may optionally include indications of the description presented by the news anchor. For example, the news program schedule may interface with a teleprompter to populate the teleprompter viewer with a script to be read by the news anchor. During such video capture events, props and/or visual aids may be included within the field of view of the camera and may be used to illustrate certain aspects of the news stories.

SUMMARY

In one aspect, an example method for use in a news production system (NPS) is disclosed. The NPS can include a camera, a switcher, a display including a display panel, and a display driver for the display. The method can include accessing a news program schedule including entries indicative of a sequence of events to be carried out using the NPS. The method can include selecting a first entry from the news program schedule. The method can include making a first determination that the first entry is associated with a digital video effect (DVE) to be run by the display driver. The display driver running the DVE can involve the driver using an input video stream, at least in part, to generate an output video stream and provide the output video stream to the display panel. The method can include prompting a user for an input responsive to making the first determination. The method can include receiving a timing signal based on a user input. The method can include causing the display driver to run the DVE responsive to receiving the timing signal. The method can include rendering the output video stream on the display panel. The method can include selecting a second entry from the news program schedule. The method can include making a second determination that the second entry is associated with a camera capture event. The method can include capturing video, using the camera, of a field of view including at least a portion of the composite display while the output video streams are rendered on the display panels. The method can include causing the switcher to provide an output video stream that is based at least in part on the video captured by the camera responsive to making the second determination.

In another aspect, an example NPS that includes a display, a display driver, a camera, a switcher, and a scheduling system is disclosed. The display can include a display panel. The display driver can be configured to use an input video stream, at least in part, to generate an output video stream and provide the output video stream to the display panel. The camera can be configured to capture video. The switcher can be configured to receive a video stream from the camera and provide an output video stream based at least in part on the received video stream. The scheduling system can be configured to: (i) access a news program schedule including entries indicative of a sequence of events to be carried out using the NPS, (ii) select a first entry from the news program schedule, (iii) make a first determination that the first entry is associated with a DVE to be run by the display driver, (iv) responsive to making the first determination, prompt a user for an input, (v) receive a timing signal based on a user input, (vi) responsive to receiving the timing signal, cause the display driver to run the DVE, (vii) select a second entry from the news program schedule, (viii) make a second determination that the second entry is associated with a camera capture event, (ix) responsive to making the second determination, cause the switcher to provide an output video stream that is based, at least in part, on video captured by the camera of a field of view including at least a portion of the display while the output video stream from the display driver is rendered on the display panel.

In yet another aspect, a non-transitory computer-readable medium is disclosed. The computer-readable medium can store instructions that, when executed by one or more processors of a computing system associated with an NPS including a camera, a switcher, a display including a display panel, and a display driver, cause performance of operations. The operations can include accessing a news program schedule including entries indicative of a sequence of events to be carried out using the NPS. The operations can include selecting a first entry from the news program schedule. The operations can include making a first determination that the first entry is associated with a DVE to be run by the display driver. The display driver running the DVE can involve the display driver using an input video stream, at least in part, to generate an output video stream and provide the output video stream to the display panel. The operations can include prompting a user for an input responsive to making the first determination. The operations can include receiving a timing signal based on a user input. The operations can include causing the display driver to run the DVE responsive to receiving the timing signal. The operations can include rendering the output video stream on the display panel. The operations can include selecting a second entry from the news program schedule. The operations can include making a second determination that the second entry is associated with a camera capture event. The operations can include capturing video, using the camera, of a field of view including at least a portion of the display while the output video stream is rendered on the display panel. The operations can include causing the switcher to provide an output video stream that is based at least in part on the video captured by the camera responsive to making the second determination.

In yet another aspect, an example method for use in a news production system (NPS) is disclosed. The NPS can include a camera, a display including a display panel, and a display driver for the display. The method include accessing a news program schedule including entries indicative of a sequence of events to be carried out using the NPS. The method can include selecting a first entry from the news program schedule. The method can include making a first determination that the first entry is associated with a digital video effect (DVE) to be run by the display driver. The method can include causing the display driver to run the DVE. The display driver running the DVE can involve the display driver using an input video stream, at least in part, to generate an output video stream and provide the output video stream to the display panel. The method can include rendering the output video stream on the display panel. The method can include selecting a second entry from the news program schedule. The method can include making a second determination that the second entry is associated with a camera capture event. The method can include capturing video, using the camera, of a field of view including at least a portion of the display while the output video stream is rendered on the display panel.

These as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

Figure 1:
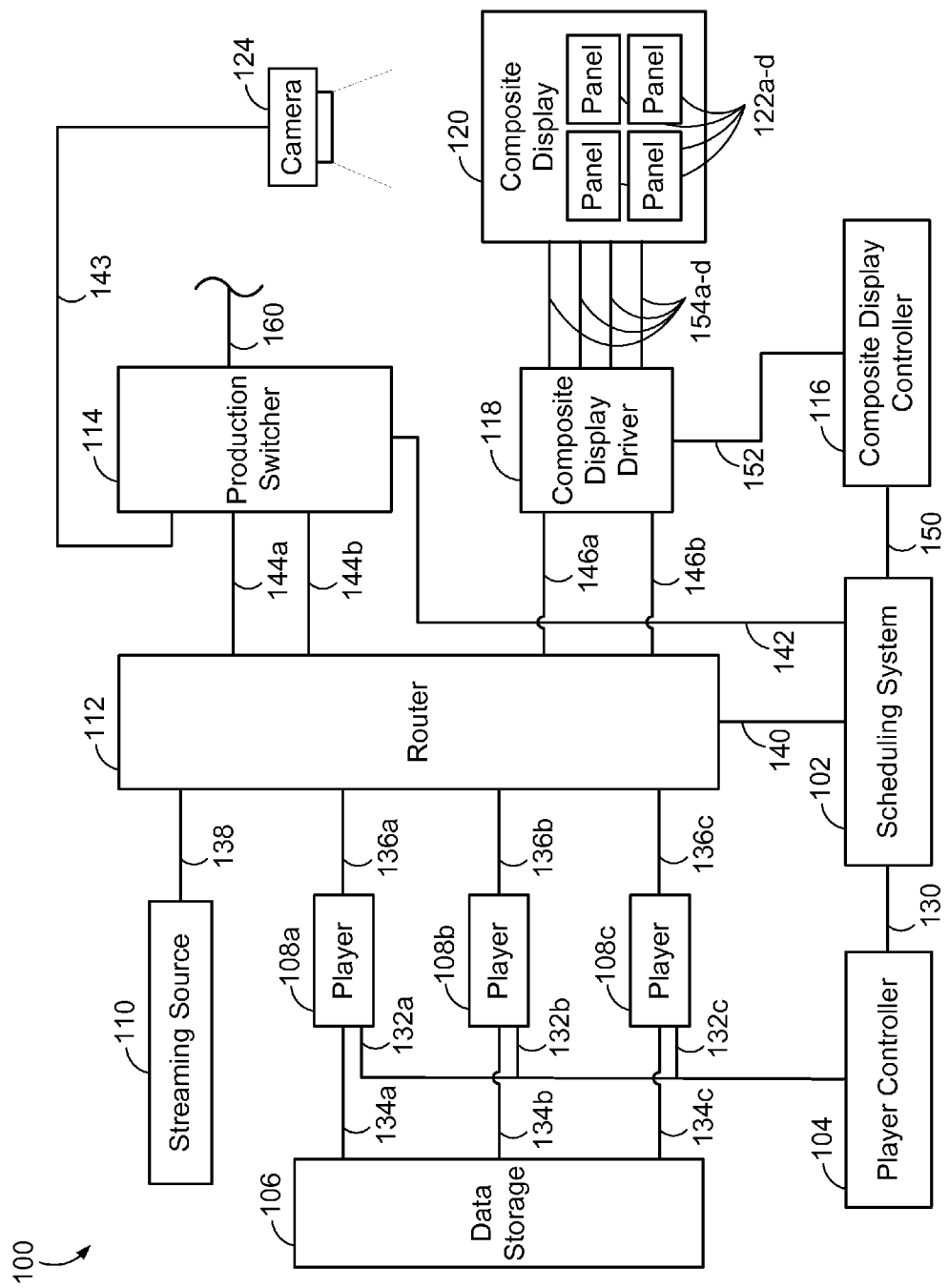
FIG. 1 is a simplified diagram of an example NPS.

An example NPS includes a camera that captures video of a news set for incorporation in a broadcast video stream. The captured video may include scenes in which a news anchor (or another individual) describes news events. In some instances, news sets may include props for the on-screen news anchor to interact with. For example, news sets may include props configured to be used as visual aids in presenting information.

One example of a conventional visual aid involves generating an output video stream in which a news anchor is shown alongside specified video content. For example, the news anchor can be depicted in a boxed frame next to video of specified content. In such a set-up, the news anchor may or may not be able to view (and react) to the specified video content in real time without looking away from the camera fixed on them.

Some NPSs may additionally or alternatively employ a green screen on which desired video content and/or images can be mapped, via video post-processing, while a news anchor is positioned in front of the green screen (i.e., between the camera and the green screen). Such systems may be employed, for example, to display a map and/or meteorological charts, diagrams, etc., while a meteorologist is positioned in front of the screen and describes the displayed content using gestures and the like. However, green screens suffer from limitations in that the video post-processing mapping techniques require that the green screen remain at a fixed location relative to the field of view of the camera. As a result, the camera capturing the green screen is limited to a fixed, unmoving perspective that is generally straight on. In addition, a news anchor may need significant training to make interaction with content on the green screen appear natural.

Another example of a visual aid used on a news set is a display panel configured to display video content. A news anchor can position themselves near the display panel and describe the video content being rendered on the display panel. Such video content may include graphs, quotes, charts, videos, images, etc., that supplement and/or elucidate the news anchor's description. The physical proximity of the news anchor and the display panel allows the anchor to contextualize and/or highlight certain aspects using gestures (e.g., pointing, facial expressions).

In some examples, an on-set visual aid may include a composite display system that includes multiple individual display panels operated by a composite display driver in a coordinated fashion to jointly render video content. The composite display driver receives an input video stream and instructs the individual display panels in a given composite display setup to jointly render the video stream. The composite display driver may subdivide the video stream to render a portion on each individual display panel. For example, a portion of each frame of a video is displayed on each individual display such that the full frame is portrayed jointly by the group of displays. In addition to sub-dividing a video stream and distributing corresponding driving signals to each individual display in a composite display, the composite display driver may also apply digital video effects (DVEs) to input video streams so as to render the input video streams in a manner specified by layout instructions. For example, DVEs may be applied to adjust the position, scale, perspective, shading, coloring, etc., of one or more videos provided to the composite display driver. The composite display driver then uses the input video to generate driver signals to each individual display panel such that the resulting output video stream is jointly displayed by the individual display panels in the composite display.

Composite displays have been employed in concert and exhibition environments to render video content alongside such performances. The specialized composite display drivers are therefore adapted to such applications, but are not conventionally integrated into an NPS scheduling system.

Conventional composite display drivers are unable to communicate with NPS scheduling systems, which typically communicate with various automated modules in the NPS using messages compliant with Media Object Server (MOS) protocol. As a result, operating such composite displays on a news set so as to coordinate the video content with other events in the NPS indicated by the scheduling system may be performed by operating the composite display driver in parallel with the NPS scheduling system.

Embodiments described herein help to facilitate at least partial regulation/control of both the operation of the composite display (or a single display panel) and the operation of the camera capturing the composite display by an NPS scheduling system in accordance with entries in a news program schedule. The presently disclosed NPS thereby provides for a system in which a composite display on the news set is used as a visual aid so as to allow for natural interactivity between a news anchor and the video content being displayed. At the same time, the presently disclosed NPS allows for the composite display to be more integrated into the automated regulation/control of the NPS scheduling system.

Systems and techniques disclosed herein are not subject to limitations of conventional systems and allow for an NPS scheduling system to communicate with a composite display driver to effect coordination between various NPS sub-systems and components and an on-set composite display. As such, video content to be rendered on the composite display may be specified in advance by an entry in a news program schedule, along with other actions to be performed using the NPS. During production of a news program, the scheduling system and/or other NPS sub-systems access news program schedule entries, identify attributes in each entry, and determine actions to be performed based on the identified attributes. Thus, the various sub-systems and components in the NPS function to carry out actions based on the news program schedule entries such that the NPS operates in a coordinated fashion in accordance with the news program schedule.

In some cases, a user interface is also provided to facilitate timing and/or synchronization of certain actions—such as to allow a producer to initiate the performance of one or more actions that various NPS systems perform on the basis of news program schedule entries. The user interface can thereby allow for some degree of manual control over aspects such as timing even as individual components in the NPS system dynamically configure themselves (without user input) to perform the functions specified by news program schedule entries.

II. Example NPS

FIG. 1 is a simplified block diagram of an example news production system (NPS) 100. The NPS 100 may be configured to perform a variety of functions related to producing a news program. The NPS may output the news program in video form, which in turn may be sent to a television-broadcasting system for broadcast. It is understood that the video output from the NPS 100 may be subjected to additional processing before being broadcast. For example, the video may be modified with a digital video effect (DVE) before being broadcast.

The NPS 100 may include one or more devices, including for example a scheduling system 102, a player controller 104, a data storage 106, one or more players 108a-c, a streaming source 110, a router 112, a production switcher 114, a composite display controller 116, a composite display driver 118, a composite display 120, and a camera 124. The systems and devices in the NPS 100 are configured to communicate between one or more others of the devices so as to cause the NPS 100 to carry out the functions described herein. Note that the NPS 100 need not include all of these devices and it may include additional devices.

The devices in the NPS 100 described herein may communicate with each other and/or with external devices via one or more communication paths. Generally, the communication paths between devices may be provided via wired and/or wireless communication in accordance with one or more communication protocols as necessary to achieve desired performance characteristics (e.g., bandwidth, latency). These devices may communicate with each other and/or with external devices according to one or more protocols. For example, the devices may communicate in accordance with one or more versions of the Media Object Server (MOS) protocol.

For example, as shown in FIG. 1, the scheduling system 102 and the player controller 104 may communicate via path 130, the player controller 104 and the players 108a-c may communicate via respective paths 132a-c, and the players 108a-c and the data storage 106 may communicate via respective paths 134a-c. Further, the players 108a-c and the router 112 may communicate via respective paths 136a-c. The streaming source 110 and the router 112 may communicate via path 138. The router 112 may communicate with the composite display driver 118 via respective paths 146a-b, and may communicate with the production switcher 114 via respective paths 144a-b. The production switcher 114 can also communicate with the camera 124 via path 143. The scheduling system 102 and the router 112 may communicate via path 140; the scheduling system 102 and the production switcher 114 can communicate via path 142. The composite display driver 118 and the composite display 120 (and the individual display panels 122a-d) may communicate via respective paths 154a-d. The scheduling system 102 and the composite display controller 116 may communicate via path 150. The composite display controller 116 and the composite display driver 118 may communicate via path 152.

A. Scheduling System

The scheduling system 102 is configured to perform functions related to scheduling and managing the production of a news program. For example, the scheduling system 102 may be configured to read a news program schedule (e.g., data that specifies an order and/or schedule of programming events involved in producing the news program). The scheduling system 102 may include a user interface to allow a user to generate the news program schedule. Once generated, the scheduling system 102 may make the news program schedule available to be accessed by other components in the NPS 100. The NPS components can then access entries in the news program schedule, select one or more entries, read data associated with those entries, and determine actions to perform based on attributes in those entries (i.e., in the received data). As a result, the various components in the NPS 100 perform various actions corresponding to each entry in the sequence indicated by the news program schedule. In some cases, the timing of each event may further be controlled, at least in part, by the scheduling system (e.g., by specifying a particular number of seconds or frame times, or another measure of time between distinct events) or perhaps a user input may indicate a start time for one or more events (e.g., to facilitate timing control by a producer or other individual).

The scheduling system 102 may be alternately referred to herein as a "sequencing system" to reflect its role in setting the sequence of various events, but not necessarily the timing of those events, which may be based on an external input (e.g., a user input). Functionality of the scheduling system 102 to effect automated control of the NPS 100 (e.g., in accordance with a predetermined scripted sequence) is described further herein.

B. Video Sources

The player controller 104 is configured to perform functions related to controlling the video players 108*a-c*, which are configured to retrieve, decode, and play out specified video content. Video files accessible by the players 108*a-c* can be stored in the data storage 106, which may be a drive array storing encoded video files. Upon retrieving and playing out selected videos, the players 108*a-c* can provide output video streams to the router 112. The player controller 104 can operate in accordance with signals via path 130 from the scheduling system 102. Similarly, the player controller can provide respective instructions via paths 132*a-c* to the players 108*a-c*, which cause the players 108*a-c* to locate and access stored video files via signals on paths 134*a-c* with the data storage 106. The players 108*a-c* can then output corresponding video streams communicated via paths 136*a-c* of the decoded video to the router 112.

Each player 108*a-c* may take a variety of forms. For instance, each player 108*a-c* may take the form of a video player device or a software-based video player executing on a computing device.

Additionally or alternatively, the router 112 can receive video signals via path 138 from a streaming source 110. The streaming source 110 can be configured to provide video that is received by the NPS 100 to be used substantially in real time, rather than pre-recorded video content that is stored in the data storage 106. For example, a streaming source may include live captured video from a production crew reporting in real time from a newsworthy location.

C. Router

The router 112 receives the video inputs from the players 108*a-c* and/or the streaming source 110, and provides video streams to the production switcher 114 and the composite display driver 118. Control signals via path 140 from the scheduling system 102 (or a sub-system controlled by the scheduling system 102) instruct the router 112 as to how to direct a given input to a given output at a given instant. For example, the router 112 may have a plurality of inputs and a plurality of outputs. At a given instant, the control signals via path 140 from the scheduling system 102 can instruct the router 112 as to which inputs (e.g., the inputs provided on paths 136*a-c*, 138) to map to one or more of the outputs (e.g., via the paths 144*a-b*, 146*a-b*). Video streams provided to the output ports at any given instant are thus based on one of the input streams to the router 112, with which one specified by the instructions via path 140. The router 112 thereby allows the scheduling system 102 to effect switching between different inputs to different components in the NPS 100 at different times.

D. Composite Display

The composite display 120 can include multiple display panels 122*a-d* positioned adjacent one another and operated to jointly render video content provided via the composite display driver. That is, the individual display panels 122*a-d* can operate to each display respective portions of a video content stream. The resulting composite display 120 can appear similar to a single display panel that spans the region occupied by the panels 122*a-d* in which the separate panels 122*a-d* may or may not be evident. For example, the display panels 122*a-d* can be substantially co-planar with one another with respective active display surfaces oriented in a common direction. However, alternative configurations may also be employed.

Composite display systems offer some performance advantages in a news set environment compared to a single display panel. In order to render video content in a manner that is readily captured by the camera 124, the individual display panels 122*a-d* are generally driven at a relatively high brightness setting to overcome washout from overhead lights. Due to the expense of display panels with high brightness capabilities, a composite display formed from multiple smaller display panels provides greater affordability and scalability than achievable using a single large display panel. In addition, using multiple individual display panels increases the effective resolution of the assembled composite display because the number of individual pixels in the resulting composite display is generally greater, for a given total display area, than possible with a comparable single display panel. Composite displays therefore mitigate pixilation and distortions even when a variety of camera perspectives are captured, including shots that zoom in on a sub-portion of the composite display.

A composite display driver 118 is provided to operate the composite display 120. The composite display driver 118 is a specialized video processor module configured to perform certain functions such as those described herein. The composite display driver 118 operates in accordance with instructions sent via path 152 from the composite display controller 116 (which itself may receive information from the scheduling systems 102). As such, the composite display 120, and the content rendered on the composite display 120, can be controlled by the scheduling system 102 (e.g., specified by a news program schedule or another predetermined sequence). The composite display driver 118 receives input video streams 146*a-b* from the router 112 and outputs display driver signals on paths 154*a-d* for the individual display panels 122*a-d* in the composite display 120. Video can be sub-divided across the panels 122*a-d*, such that the panels 122*a-d* jointly render an intended output video stream. The composite display driver 118 can be configured to operate a given one of the display panels 122*a-d* to display a respective portion (e.g. a sub-frame) of an output video stream such that the individual panels 122*a-d* in the composite display 120 are operated in coordination to jointly render the output video stream.

In some cases, the composite display driver 118 may first generate an output video stream based in part on the input video stream(s) (e.g., the video streams provided via paths 146*a-b*). Once generated, the output video stream can be subdivided into portions for each of the display panels 122*a-d*, and re-sampled and/or converted as necessary to reduce distortion, etc. when rendered on the composite display 118. The composite display driver 118 may also be configured to sub-divide and/or re-sample in a manner that accounts for separations between adjacent ones of the individual panels 122*a-d* (e.g., due to bezels separating the display panels 122*a-d*).

In addition to sub-dividing the output video stream to the individual display panels 122*a-d*, the composite display driver 118 can be configured to apply a DVE to the incoming video stream(s). For example, the composite display driver 118 may be configured to apply scaling, positioning, perspective, shading, color-correction, and/or other DVEs to one or multiple input video streams provided by the router 112 to create the output video stream. In one example, the output video stream for the composite display 120 may include multiple scaled framed windows overlaid on a background populated by scrolling text. Each window of video content can have a scaling, perspective, and position on the composite display 120 specified by signals from the composite display controller 116, which operates in accordance with instructions from the scheduling system 102.

Moreover, in some cases, the composite display 120 may be implemented using a single display panel, in which case the composite display driver 118 can apply DVE(s) and generate an output video stream for the single display panel without sub-dividing and/or re-sampling for rendering on multiple display panels. Such a single display panel may, in some cases, be a display panel with a native resolution different from the resolution of incoming video streams. For example, the display panel may have a resolution defined by an array of pixels with 2160 rows (e.g., an Ultra High Definition display panel with 3840 by 2160 pixels), and the incoming video streams may have a resolution defined by 1080 rows (1920 by 1080 pixels). In such an implementation, the display driver 118 may apply DVE(s) and resample and/or rescale the incoming video streams as necessary so as to generate an output video stream that corresponds to the native resolution of the single display panel.

E. Camera

The camera 124 can be situated to capture a field of view that includes at least a portion of the composite display 120. For example, the composite display 120 can be situated on a news set, and the camera 124 can be positioned to capture a portion of the news set that includes the composite display 120. As such, video captured by the camera 124 can include any video content displayed via the composite display 120. While content is being displayed on the composite display 120, the scheduling system 102 can request video captured using the camera 124 to be mapped to an output of the production switcher 114.

Moreover, a news anchor (or other individual) may also be within the field of view of the camera 124 (e.g., by standing in front of the composite display 120). So positioned, the news anchor may use the composite display 120 as a visual aid to enhance description of certain news events. For instance, graphs, videos, quotes, etc., may be displayed on the composite display 120 while a news anchor describes news happenings and gestures toward content on the composite display 120 to emphasize or deemphasize points as desired. Furthermore, news anchors can provide context for information on the composite display 120 by including commentary and analysis and by their reactions (e.g., facial reactions, gestures, postures).

F. Production Switcher

The production switcher 114 receives video inputs and uses the video input stream to generate a video output stream from the NPS 100, on path 100. The scheduling system 102 can provide instructions to the production switcher 114 via path 142 to indicate which video stream (or multiple video streams) to use to generate the output video stream on path 160. The production switcher 114 can receive video inputs from the router 112 (e.g., streaming sources and/or pre-recorded played out videos via paths 144a-b) and also from the camera 124 (e.g., via path 143). The output video steam on path 160 may be subjected to further processing and may be passed to a broadcasting system.

In operation then, the scheduling system 102 may be configured to provide information (e.g., a news program schedule) to various components in the NPS 100 to operate such that specified stored or streamed video is rendered on the composite display panel 120. At or about the same time, the provided information can cause the production switcher 114 to use video from the camera 124, which captures at least a portion of the composite display 120, to generate the output video stream. The composite display 120 can thereby be operated in a substantially automated fashion to render specified video content by the same scheduling system 102 that regulates operation of other devices in the NPS 100. As such, the composite display 120 can be readily integrated into the NPS 100 to render content in accordance with a predetermined script of production events to produce a news program.

In some cases, the performance of the operations described above can be carried out in response to receipt of a user input, which may be used as a timing signal to control the timing or synchronization of various events. For instance, various devices in the NPS may dynamically prime themselves to perform functions specified in a news program schedule, then prompt a user for an input, and initiate performance of those functions in response to receipt of a timing signal based on a user input. As such, a producer (or director or other personnel) may evaluate readiness to perform a given next function(s), and then, upon judging that the system is ready to proceed, provide a user input. Upon receiving the user input, the pertinent NPS devices then initiate the given function(s), perhaps after a predetermined delay interval. Thus, while not specifically illustrated in FIG. 1, one or more of the devices in NPS 100 may include (or be in communication with) a user interface that allows for receiving user inputs and perhaps for outputting information, such as diagnostic and status information, etc.

G. Example NPS Device

Figure 2:
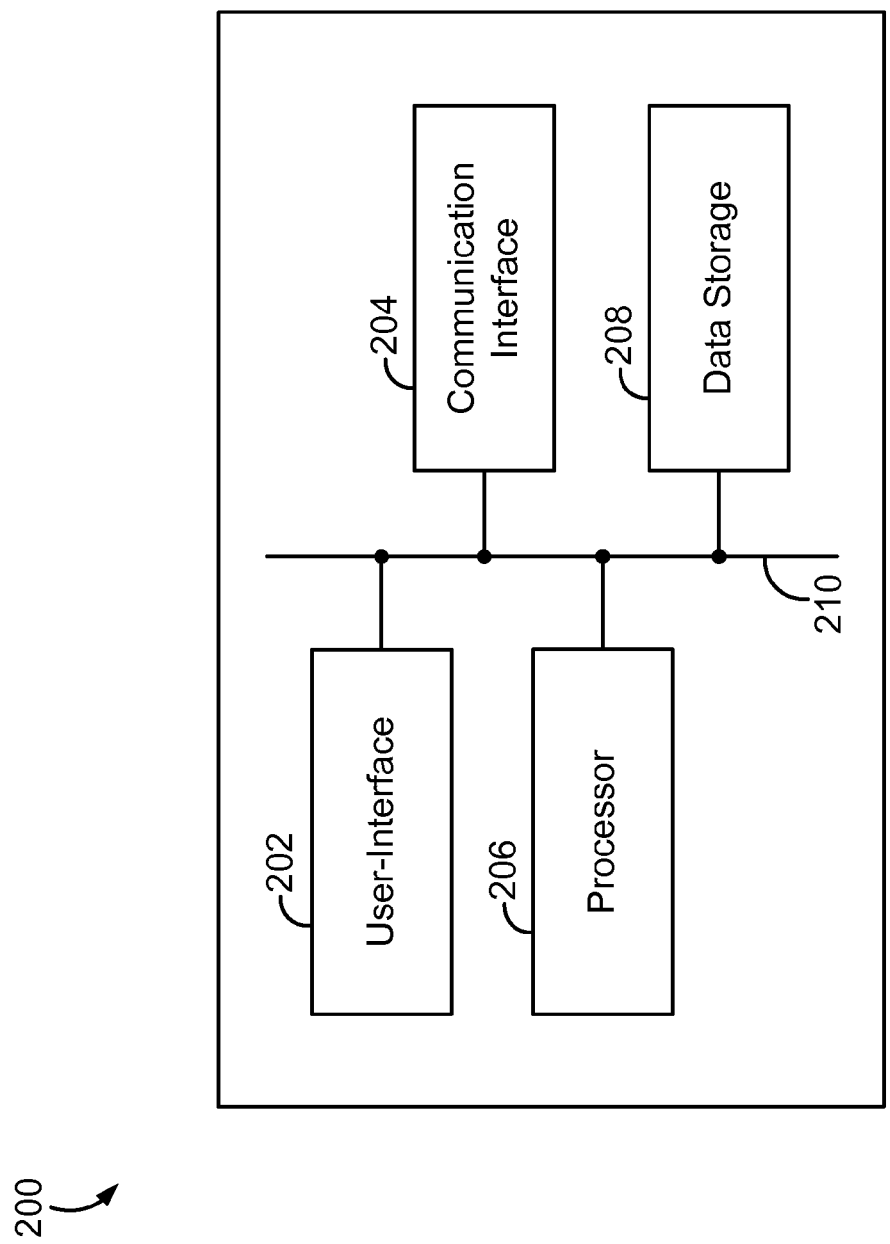
FIG. 2 is a simplified diagram of an example device of the NPS of FIG. 1.

FIG. 2 is a simplified block diagram of a device 200. The device 200 may take a variety of forms, including for example the scheduling system 102, the player controller 104, the data storage 106, one of the video players 108a-c, the streaming source 110, the router 112, the production switcher 114, the composite display controller 116, and/or the composite display driver 118.

The device 200 may include various components, including for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker. In some cases, the user-interface 202 may be used by a producer or other newsroom personnel to provide inputs for control of timing or synchronization of certain events performed in accordance with news program schedule entries.

For instance, a producer (or director, etc.) may monitor events on a news set, such as the readiness of other personnel for certain events to be performed and/or status indicators of various NPS sub-systems (which status indicators may be communicated using output components of the user-interface 202). Once the producer judges that the conditions are ready for performance of a next event (or sequence of events) specified by one or more news program schedule entries, the producer can provide an input using the user-interface 202 (e.g., by pressing a button). Upon receipt of data indicating the user input, the NPS can then perform the particular event(s). Such user inputs are therefore referred to herein as timing signals or initiation signals. Moreover, in some cases events may be carried out following a predetermined delay after receipt of an initiation signal. Although in other examples, the NPS may perform events without regard to a user input. For instance, the NPS may perform a DVE and display resulting video content (or carry out another event) in response to associating a news program schedule entry (or entries) with those events. The time at which the NPS performs those events may be based on a predetermined absolute time (e.g., set by a reference clock that synchronizes NPS sub-systems), or may be based on a predetermined relative delay (e.g., a predetermined delay following execution of another event by the NPS).

The communication interface 204 may function to allow the device 200 to communicate with other devices (e.g., over the paths described above). The communication interface 204 may be configured to transmit and/or receive various types of data, including for example control data or video stream data. In one example, the communication interface 204 may take the form of a wired interface, such as an Ethernet port, USB port, or HD-SDI port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the functions described herein and/or shown in the accompanying drawings. As such, the data storage 208 may take the form of a non-transitory computer-readable storage medium, having stored thereon program instructions that, upon execution by the processor 206, cause the device 200 to perform one or more of the functions described herein and/or shown in the accompanying drawings.

III. Example Capture of Composite Display Using Camera

Figure 3:
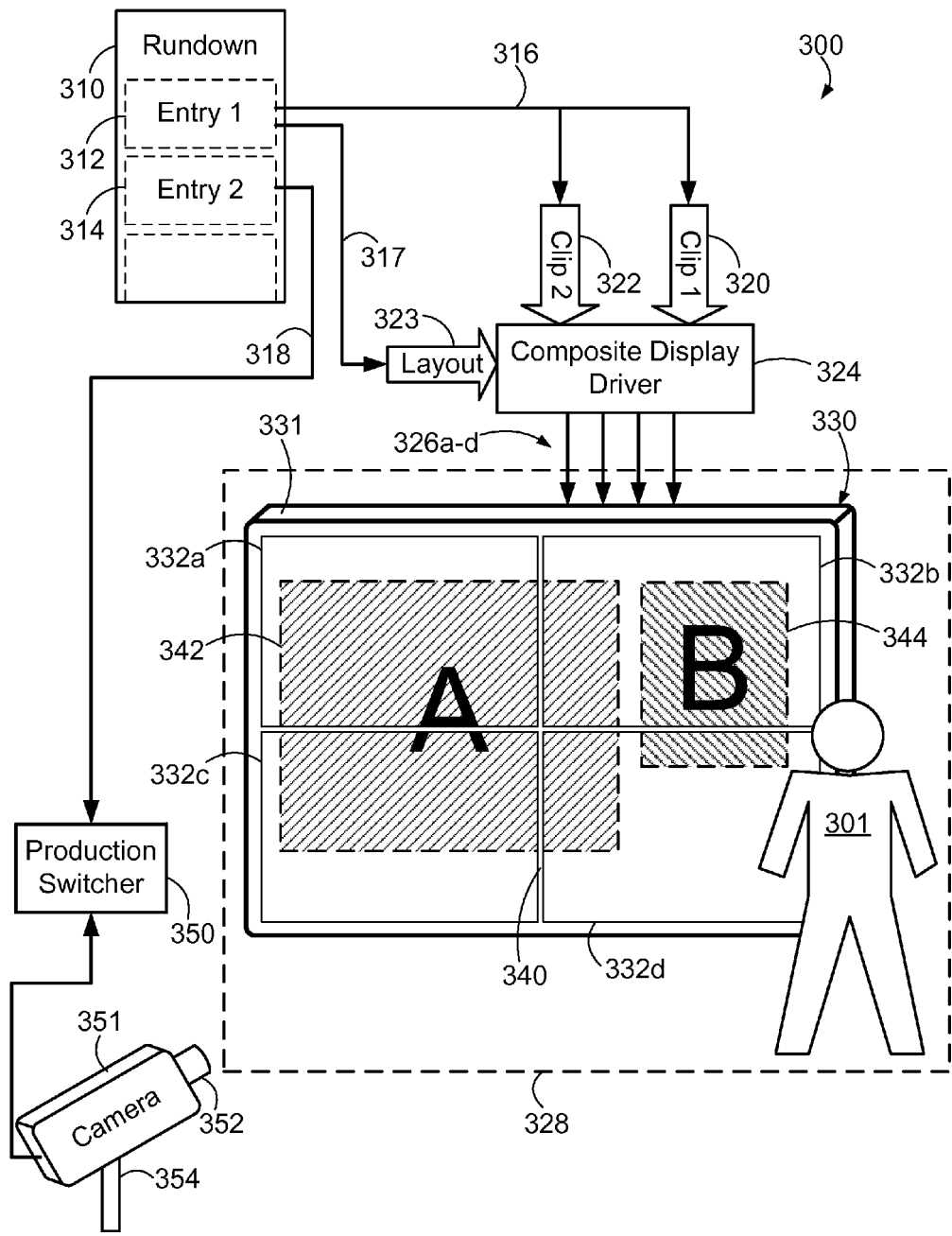
FIG. 3 symbolically illustrates an example process flow in which a composite display is utilized as an on-set visual aid on a news set.

FIG. 3 illustrates an example NPS 300 in which a composite display is utilized as a visual aid on a news set. The NPS 300 can be similar to the NPS 100 described above in connection with FIG. 1, although some systems and devices are omitted from the illustration in FIG. 3 to emphasize signaling flow within the system 300 during an example operation.

An example news program schedule 310 includes multiple entries 312, 314. The news program schedule 310 includes multiple news program schedule entries that indicate actions to be performed by the NPS 300. The news program schedule 310 is used by a sequencing system (not shown) similar to the sequencing system 102 described in connection with FIG. 1 to generate suitable control signals to various components and sub-systems in the NPS 300 to cause steps be performed. The news program schedule 310 can include ordered entries, each represented as a separate row. Each entry includes one or more attributes, such as timing information (e.g., to indicate a start time of a particular action), video source information (e.g., a title, a clip identifier, a player identifier), router instructions (e.g., to map router inputs to router outputs so as to distribute video streams throughout the NPS 300), composite display information (e.g., indications of digital video effects to apply to one or more input video streams to generate an output video stream that is rendered on the composite display), and production switcher information (e.g., indications of which video stream inputs to use to generate an output video stream). In one example, a user may create the news program schedule 310 via a user interface of a scheduling system (e.g., similar to the scheduling system 102 described in connection with FIG. 1).

The NPS 300 also includes a composite display 330 that is driven by a composite display driver 324. The composite display 330 and composite display driver 324 may be similar to the composite display 120 and composite display driver 118 described above in connection with FIG. 1. The composite display 330 can include a frame or housing 331 to which individual display panels 332a-d are mounted adjacent to one another so as to form a combined display area. As shown in FIG. 3, the composite display 330 can have a rectangular display area sub-divided into quadrants and each quadrant can include a separate display panel. For example, the display panel 332a can be mounted in an upper left quadrant; display panel 332c can be mounted in a lower left quadrant; display panel 332b can be mounted in an upper right quadrant; display panel 332d can be mounted in a lower right quadrant. The edges between adjacent display panels (e.g., the display panels 332c and 332d) may be separated by a bezel 340. Each of the individual display panels 332a-d can then receive a respective separate driving signal 326a-d (e.g., a video stream corresponding to the respective quadrant for each display panel) from the composite display driver 324.

The NPS 300 also includes a production switcher 350, which receives an input video stream from a camera 351 (among other inputs) and generates an output video stream, which may be sent to a broadcast system, for example. The camera 351 is positioned to capture video of a field of view 328 that includes the composite display 330. The camera 351 can be mounted on an adjustable arm 354 that allows for adjusting the orientation and/or position of the camera 351. The camera 351 can also include a primary lens assembly 352 configured to focus incoming light from the field of view 328 onto a plane including a digital image sensor within the camera 351. The digital image sensor (e.g., CCD array, CMOS array) can then output data indicative of the light received to create a stream of the captured video (e.g., a stream of digital values indicative of the light received by the camera 351).

During operation, the entries in the news program schedule 310 can be accessed by a scheduling system and suitable information can then be provided to components in the NPS 300 to cause them to perform actions corresponding to each entry. For example, the first entry 312 can include attributes specifying a source of video to be played on the composite display 330 and the second entry 314 can include attributes to cause video captured by the camera 351 to be used by a production switcher 350 in generating an output video stream. For example, the second entry 314 may function as a request for the production switcher 350 to map an input from the camera 351 to its output video stream. When the scheduling system may send signals 318 based on the second entry 314 to the production switcher 350, which may then map the video streams accordingly.

Upon accessing the first entry 312, the scheduling system can identify attributes indicated by the first entry 312. The scheduling system can then send signals 316, 317 to cause corresponding actions to be performed. For example, signals 316 may be sent to a player controller so as to cause video players controlled thereby to retrieve, decode, and play out particular video clips. Signals 316 may also be sent to a router to cause input video streams from a streaming source and/or from videos provided by the players to be provided at the inputs to the composite display driver 324. In combination, the signals 316 can thereby cause sub-systems of the NPS 300 to coordinate such that specified pre-recorded videos to be retrieved from storage, played out, and routed to the composite display driver 324. As represented in FIG. 3, the signals 316 generated in response to accessing and reading the news program schedule entry 312 cause two video clips to be provided to the composite display driver 323: clip 1 320 and clip 2 322. The signals 316 can optionally specify that the two clips 320, 322 are played out contemporaneously (i.e., such that a period in which clip 1 320 is played out overlaps with a period in which clip 2 322 is played out). The signals 316 may also optionally specify that the two clips 320, 322 are played out simultaneously (i.e., such that both clips 320, 322 begin being played out at or about the same time). Moreover, some embodiments may involve routing video streams other than pre-recorded videos being played out to the composite display driver 324, such as from a streaming source (e.g., the streaming source 110 described above in connection with FIG. 1).

The first entry 312 may further include attributes that specify a particular layout with which to arrange the clips on the composite display 330. For example, the first entry 312 can specify a size or scaling factor of the clip and/or a position on the composite display 330. Upon recognizing indications of a particular layout, the scheduling system can send signals 317 to a composite display controller, which then causes a layout indicator 323 to be provided to the composite display driver 324. The layout indicator 323 may specify that clip 1 320 is rendered at a first absolute or relative position on the display area of the composite display 330 while the second clip 322 is rendered at a second absolute or relative position on the display area of the composite display 330. The composite display driver 324 is configured to receive the clips 320, 322 and the layout indicator 323 and generate an output video stream to the composite display 330 (e.g., by providing the driver signals 326a-d to the respective display panels 332a-d) sufficient to cause the clips 320, 322 to be rendered according the layout specified by the layout indicator 323.

Additionally or alternatively, the layout may specify a "trapezoidal scaling" to apply a perspective to the rendered clips. For example, rather than rendering the clips within a rectangle having equal widths along top and bottom edges and equal heights along left and right edges, the trapezoidal squeeze may scale a video into a shape with unequal top and bottom edges and/or unequal left and right edges. Such a trapezoidal effect may cause the clip to be rendered from a perspective view. Moreover, clips may be rendered with some degree of cropping, such as by rendering a rectangular source video within a region shaped as a square (e.g., by cropping away side edges of the source video), circle, oval, ellipse, polygon, or any other closed shape.

An example layout of the two clips 320, 322 is shown in FIG. 3 in which clip 1 320 is represented by a first hashed region 342 including the letter "A" and clip 2 is represented by a second hashed region including the letter "B." The position and size (e.g., scaling) of each clip can be specified by the layout indicator 323 and the composite display driver 324 can be configured to apply DVEs sufficient to cause the clips to be rendered in the specified layout. As shown in FIG. 3, the first clip (indicated by the letter "A") may be rendered in a region 342 that spans multiple ones of the individual display panels 332a-d.

Generally, the composite display driver 324 can apply one or more DVEs to scale, re-sample, crop, and/or position the video content from input video streams in accordance with the indicated layout. Further still, a static or dynamic background may be included and static or dynamic text, logos, other visual content, etc., may be included on the background and/or superimposed over the clip-filled regions 342, 344. The resulting output video stream incorporating the clip(s) in accordance with the indicated layout is then suitable for rendering using the composite display 330, and the composite display driver 324 can provide respective driving signals 326a-d to each display panel 332a-d in the composite display 330. In some examples, the signals 316, 317 generated by the scheduling system in response to accessing the first entry 312 may specify that the clips 320, 322 be provided to the display driver 324 during a period that is contemporaneous (e.g., overlaps in time) with the period in which the driver 324 applies the DVE(s) specified by the signal 317.

Upon accessing the second entry 314, the scheduling system can identify attributes indicated by the second entry 314. The scheduling system can then send signals 318 to cause corresponding actions to be performed. For example, signals 318 may be sent to the production switcher 350 so as to cause the production switcher 350 to receive video captured by the camera 351, and to use the captured video to generate an output video stream from the NPS 300. In particular, the second entry 314 may specify that the production switcher 350 use camera-captured video of the field of view 328 while the composite display 330 renders the video content specified by the first entry 312. The field of view 328 can include both the composite display 330 and a news anchor 301 (or other individual) who uses the composite display 330 as a visual aid in presenting news topics. For example, the news anchor 301 may describe news events while gesturing toward videos, graphs, quotes, photos, other visual aids, etc., that are rendered on the composite display 330. In some examples, the composite display 330 may display video from a field correspondent, who may then converse (or otherwise interact) with the news anchor 301.

In some cases, the first and second entries 312, 314 include timing information to cause the performance of the corresponding actions (rendering specified video content on the composite display 330 and providing an output video stream based on capturing video of a scene including the composite display 330) to be carried out contemporaneously. In some cases, the initiation of one or both of the actions indicated by the entries 312, 314 may be at least partially based on an external input, such as an input received at a user interface associated with the scheduling system. Upon initiation, the timing information may specify an ordering and/or pre-determined delay before starting the next action (e.g., timing information may specify that the action associated with the second entry 314 commences at the same time the action associated with the first entry is initiated). For example, the timing information may cause the composite display 330 to begin displaying specified video content substantially simultaneously with the production switcher switching to generate an output stream based on camera-captured video of the composite display 330. In another example, the period in which specified video content is rendered on the composite display 330 can at least partially overlap with a period in which the output video stream is based on video captured by the camera 351.

It should also be noted that the news program schedule 310 has been greatly simplified for the purposes of providing an illustrative example of the disclosed system and method in connection with FIG. 3. In practice, a news program schedule is likely, although not required, to include a significant amount of data. For example, news program schedule entries may include additional attributes, including for example, an index or "page" number, an estimated duration, an actual duration, and/or an author, some or all of which may be used to generate signals (e.g., the signals 316, 317, 318) and some or all of which may be used for other purposes, such as diagnostics, archiving, etc. Further, each news program schedule entry may include a script that causes certain NPS-related functions to be performed. However, for the sake of simplicity, the news program schedule 310 is illustrated in simplified form.

IV. Example Operations

Figure 4:
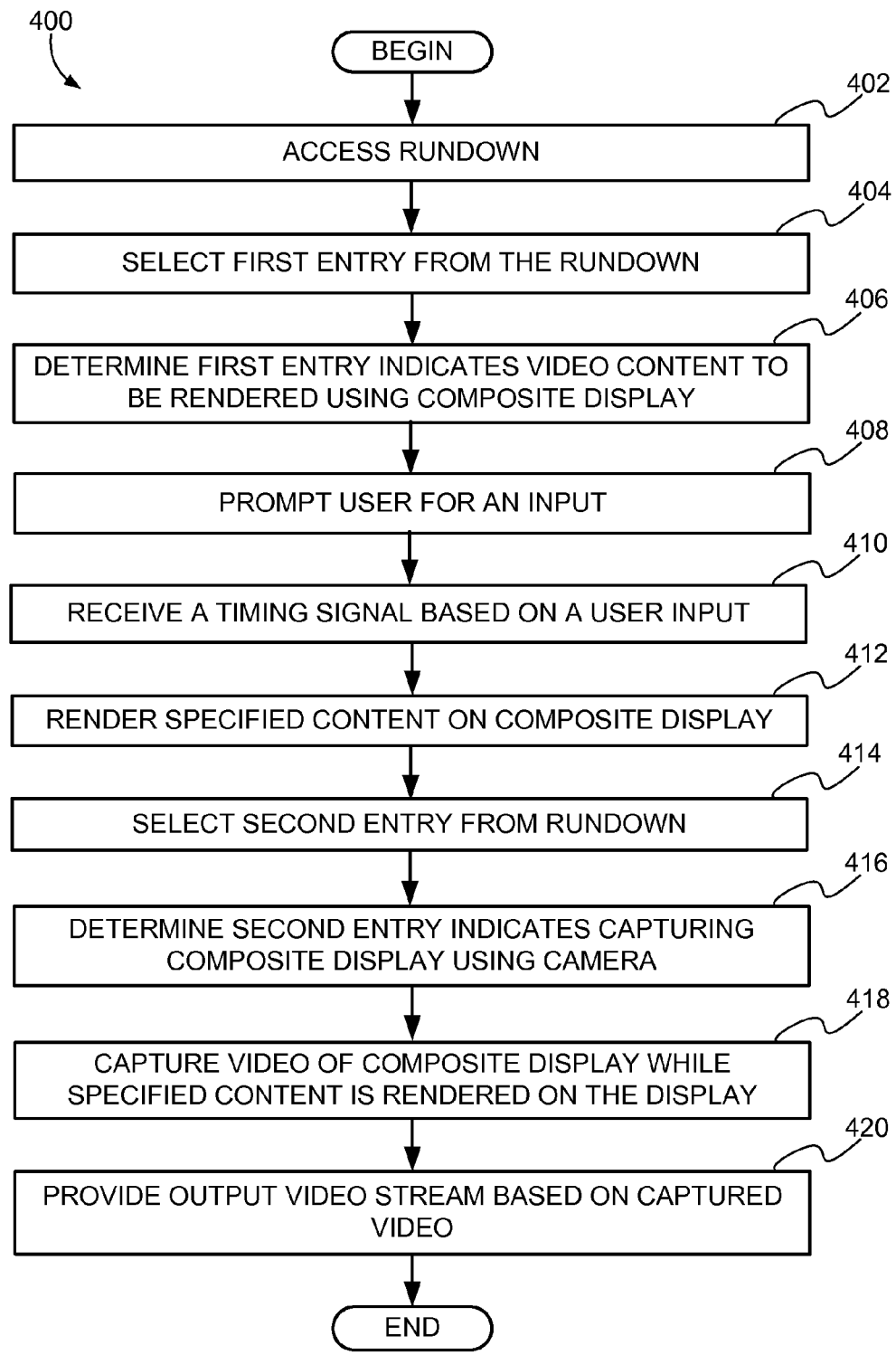
FIG. 4 is a flowchart of an example process that may be performed by the news production systems described herein.

FIG. 4 is a flowchart of an example process 400 that may be performed by the NPSs described herein. For example, the process 400 may be performed by NPS 100 described above in connection with FIG. 1 and/or the NPS 300 described above in connection with FIG. 3.

At block 402, the method may involve accessing a news program schedule that includes entries indicative of a sequence of events to be carried out by the NPS. For example, a computing system associated with a scheduling system for the NPS can access the news program schedule file and begin reading its contents. At block 404, the method may involve selecting a first entry from the news program schedule. At block 406, the method may involve making a first determination that the first entry is associated with a digital video effect (DVE) to be run by the display driver. For example, the first entry can be analyzed by the scheduling system, the player controller, and/or the composite display controller to determine that the first entry indicates an event using the composite display. Alone or in combination with other devices, the scheduling system can identify attributes in the first entry and, based on the presence and/or values of the identified attributes, determine that the first entry specifies video content to be rendered on the composite display after running a particular DVE, which may also be specified by attributes in the first entry.

At block 408, the method may involve prompting a user for an input responsive to making the first determination. For example, a user interface may be used to prompt a user to initiate the composite display event corresponding to the first determination by providing a user input to be used as a timing signal. At block 410, the method may involve receiving a timing signal based on a user input. For instance, the user may press a button or the like, and the timing of the button press may be used to generate a timing signal or initiation signal to the composite display driver, router, player controller, and/or other devices in the NPS involved in performing the function(s) corresponding to the first determination. At block 412, the method may involve causing the display driver to run the DVE responsive to receiving the timing signal. The display driver running the DVE may involve the driver using an input video stream, at least in part, to generate a plurality of output video streams. Each of the plurality of output video streams can be provided to a corresponding one of the plurality of display panels in the composite display. The method may involve rendering the output video streams on the respective display panels of the composite display. For example, information indicative of the video content to display and the layout arrangement therefore can be conveyed to the composite display driver, which then runs DVEs to generate an output video stream in accordance with the received information, and which subdivides the generated video to drive each display panel in the composite display.

At block 414, the method may involve selecting a second entry from the news program schedule. At block 416 the method may involve making a second determination that the second entry is associated with a camera capture event. For example, the second entry may indicate an event in which video is captured of the composite display and then the captured video is used to generate an output video stream from the NPS (e.g., via the production switcher). In some cases, the production switcher may be instructed to begin basing its output video stream, at least in part, on video captured by a camera, which camera is positioned and oriented so as to capture a field of view that includes the composite display. At block 418, the method may involve capturing video, using the camera, of a field of view including at least a portion of the composite display while the output video streams are rendered on the display panels. For example, an on-set camera may be used by a manual operator to capture a field of view that includes at least a portion of the composite display.

In some cases, the camera may be configured to be operated based on signals from the scheduling system (e.g., a MOS-compliant camera). The camera may perform functions so as to be turned on, re-directed, focused, etc., based on information from the scheduling system in accordance with entries in the news program schedule. Thus, the second entry may specify that the camera be turned on, directed at the composite display, focused, and capture video, and the scheduling system can facilitate occurrence of those actions by sending suitable MOS-compliant signals to the camera.

At block 420, the method may involve causing the switcher to provide an output video stream that is based at least in part on the video captured by the camera responsive to making the second determination. For example, the production switcher that provides the output video stream from the NPS can be requested to begin generating the output stream at least partly based on video received from the camera (i.e., the captured video that includes the composite display rendering the specified video content).

V. Example Variations

While one or more functions have been described as being performed by certain devices or entities (e.g., the scheduling system 102), the functions may be performed by any device or entity, such as those included in the NPS 100 or the NPS 300 described above.

In some embodiments, a given news program schedule entry may specify a single action to be performed by the NPS. In other embodiments, a given entry may specify multiple actions to be performed and such actions may be performed sequentially, simultaneously, or in another manner as specified by the entry. Thus, some embodiments may include using a single entry to facilitate both rendering of content on the video display and using captured video from the camera to generate a video output stream from the production switcher, rather than using separate entries for each as described in connection with FIG. 3. Moreover, some embodiments may include using multiple entries to facilitate performance of action(s) described as associated with a single entry herein.

In some embodiments, the NPS may include a single display panel instead of a composite display, or perhaps in addition to a composite display, used as a visual aid on a news set. In such embodiments, the NPS can function in accordance with entries in a news program schedule to provide specified input video stream(s) to a display driver, and then the display driver can run specified DVEs using the input video stream(s), and generate an output video stream to be rendered on the single display panel. Thus, the functions described in connection with the description of a composite display and a composite display driver may be extended to functions performed of a single display panel operated by suitable display driver. In particular, many functions described herein as being performed by a composite display driver (e.g., running DVEs in accordance with an entry in a news program schedule) may instead be performed by a display driver suitable for generating video to be rendered on a single display panel. And similarly, many functions described herein as being performed by a composite display (e.g., rendering an output video stream provided by the display driver) may instead be performed by a single display panel.

Further, while examples of the disclosed method have been described in connection with an NPS, examples of the method may be implemented in other environments.

Also, the functions need not be performed in the disclosed order, although in some examples, an order may be preferred. And not all functions need to be performed to achieve the desired advantages of the disclosed system and method, and therefore not all functions are required. For instance, the method described in connection with FIG. 4 may be altered by omitting certain blocks, such as blocks 408 and 410, in which case the timing of the remaining blocks may not be dependent on a timing signal derived from a user input.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method for use in a news production system including a camera, a switcher, a display including a display panel, and a display driver for the display, the method comprising:
    selecting a first entry from a news program schedule;
    making a first determination that the first entry is associated with a digital video effect (DVE);
    responsive to making the first determination, prompting a user for an input;
    receiving user input;
    based on the received user input, causing the display driver to run the DVE, wherein the display driver running the DVE involves the display driver using an input video stream, at least in part, to generate a first output video stream;
    rendering the first output video stream on the display panel;
    capturing video, using the camera, of a field of view including at least a portion of the display while the first output video stream is rendered on the display panel;
    selecting a second entry from the news program schedule;
    making a second determination that the second entry is associated with a camera capture event; and
    responsive to making the second determination, causing the switcher to provide a second output video stream that is based at least in part on the captured video.

2. The method of claim 1, further comprising:
    making a third determination that the first entry is associated with a video clip to be played out and used as the input video stream;
    responsive to making the third determination, causing the video clip to be played out and used as the input video stream to the display driver.

3. The method of claim 2, wherein causing the video clip to be played out and used as the input video stream comprises:
    instructing a video player to play out the video clip; and
    instructing a router to receive the played out video clip from the video player and provide the played out video clip to the display driver.

4. The method of claim 3, wherein a period in which the played out video clip is provided to the display driver is contemporaneous with a period in which the display driver runs the DVE.

5. The method of claim 2, wherein the video clip is a first video clip, wherein the input video stream is a first input video stream, and wherein the display driver running the DVE involves the display driver using the first input video steam and a second input video stream, at least in part, to generate the first output video stream, the method further comprising:
    making a fourth determination that the first entry is associated with a second video clip to be played out and used as the second input video stream; and
    responsive to making the fourth determination, causing the second video clip to be played out and used as the second input video stream.

6. The method of claim 1, wherein the display is a composite display and the display panel is one of multiple display panels included in the composite display, and wherein the display driver running the DVE further involves the display driver: (i) using the input video stream, at least in part, to generate multiple output video streams, and (ii) providing the output video streams to the display panel, wherein each of the multiple output video streams is provided to a corresponding one of the multiple display panels.

7. The method of claim 1, further comprising:
    making a third determination that the selected entry is associated with a streaming video source to be used as the input video stream to the display driver; and
    responsive to making the third determination, causing the display driver to receive the input video stream from the streaming video source.

8. The method of claim 1,
    wherein the first entry specifies a layout indicator for the DVE, wherein the layout indicator is indicative of a manner in which to use the input video stream to generate the first output video stream from the display driver, and
    wherein causing the display driver to run the DVE includes generating the first output video stream in accordance with the identified layout indicator.

9. The method of claim 8, wherein the layout indicator specifies one or more of a size or position of the input video stream within the first output video stream.

10. A news production system (NPS) comprising:
    a display including a display panel;
    a display driver configured to use an input video stream, at least in part, to generate a first output video stream and provide the first output video stream to the display panel;
    a camera configured to capture video;

a switcher configured to receive captured video from the camera and provide a second output video stream based at least in part on the captured video; and a scheduling system configured to: (i) select a first entry from a news program schedule, (ii) make a first determination that the first entry is associated with a digital video effect (DVE), (iii) responsive to making the first determination, prompt a user for an input; (iv) receive user input; (v) responsive to receiving the user input, cause the display driver to run the DVE, (vi) select a second entry from the news program schedule, (vii) make a second determination that the second entry is associated with a camera capture event, and (viii) responsive to making the second determination, cause the switcher to provide a second output video stream that is based, at least in part, on the captured video, wherein the captured video is of a field of view including at least a portion of the display while the first output video stream from the display driver is rendered on the display panel.

11. The NPS of claim 10, further comprising:

a video player configured to retrieve and play out video clips; and a router configured to receive played out video from the video player and provide the played out video to the display driver to be used as the input video stream, wherein the scheduling system is further configured to: (i) make a third determination that the first entry is associated with a video clip to be played out and used as the input video stream to the display driver, and (ii) responsive to making the third determination, cause the video player to play out the video clip and instruct the router to provide the played out video clip to the display driver.

12. The NPS of claim 11, wherein the scheduling system is further configured such that a period in which the played out video clip is provided to the display driver is contemporaneous with a period in which the display driver runs the DVE.

13. The NPS of claim 11, wherein the video clip is a first video clip, wherein the input video stream is a first input video stream, and wherein the display driver is further configured to run the DVE by using the first input video steam and a second input video stream, at least in part, to generate the first output video stream, and wherein the scheduling system is further configured to: (i) make a fourth determination that the first entry is associated with a second video clip to be played out and used as the second input video stream; and (ii) responsive to making the fourth determination, cause the video player to play out the second video clip and instruct the router to provide the played out second video clip to the display driver.

14. The NPS of claim 13, wherein the display is a composite display and the display panel is one of multiple display panels included in the display; and wherein the display driver is further configured to: (i) use the input video stream, at least in part, to generate multiple output video streams, and (ii) provide the output video streams to the display panel, wherein each of the multiple output video streams is provided to a corresponding one of the multiple display panels.

15. The NPS of claim 10, wherein the scheduling system is further configured to: (i) make a third determination that the first entry is associated with a streaming video source to be used as the input video stream to the display driver, and (ii) responsive to making the third determination, cause the display driver to receive the input video stream from the streaming video source.

16. The NPS of claim 10, wherein the first entry specifies a layout indicator for the DVE, wherein the layout indicator is indicative of a manner in which to use the input video stream to generate the first output video stream, and wherein the display driver is configured to run the DVE by generating the first output video stream in accordance with the layout indicator.

17. A non-transitory computer-readable medium storing instructions that, when executed by one or more processors of a computing system associated with a news production system including a camera, a switcher, a display including a display panel, and a display driver, cause performance of operations comprising:

selecting a first entry from a news program schedule;

making a first determination that the first entry is associated with a digital video effect (DVE);

responsive to making the first determination, prompting a user for an input;

receiving user input;

based on the received user input, causing the display driver to run the DVE, wherein the display driver running the DVE involves the display driver using an input video stream, at least in part, to generate a first output video stream;

rendering the first output video streams on the display panel;

capturing video, using the camera, of a field of view including at least a portion of the display while the first output video stream is rendered on the display panel;

selecting a second entry from the news program schedule;

making a second determination that the second entry is associated with a camera capture event; and responsive to making the second determination, causing the switcher to provide a second output video stream that is based at least in part on the captured video.

18. The non-transitory computer-readable medium of claim 17, the operations further comprising:

making a third determination that the first entry is associated with a video clip to be played out and used as the input video stream;

responsive to making the third determination, causing the video clip to be played out and used as the input video stream to the display driver.

19. The non-transitory computer-readable medium of claim 17, the operations further comprising:

making a third determination that the selected entry is associated with a streaming video source to be used as the input video stream to the display driver; and responsive to making the third determination, causing the display driver to receive the input video stream from the streaming video source.

20. The non-transitory computer-readable medium of claim 17, wherein the first entry specifies a layout indicator for the DVE, wherein the layout indicator is indicative of a manner in which to use the input video stream to generate the first output video stream from the display driver, and wherein causing the display driver to run the DVE includes generating the first output video stream in accordance with the identified layout indicator.

* * * * *